United States Patent [19]

Brandt

[11] 4,177,628

[45] Dec. 11, 1979

[54] HILLSIDE ATTACHMENT FOR COMBINES

[76] Inventor: Harold H. Brandt, Garnavillo, Iowa 52049

[21] Appl. No.: 864,199

[22] Filed: Dec. 27, 1977

[51] Int. Cl.$^2$ ............................................. A01D 35/28
[52] U.S. Cl. .......................................... 56/209; 56/2; 56/DIG. 5
[58] Field of Search .......... 56/209, DIG. 5, DIG. 10, 56/2; 130/27 AE

[56] References Cited

U.S. PATENT DOCUMENTS

| | | | |
|---|---|---|---|
| 2,947,134 | 8/1960 | Clifford et al. | 56/209 |
| 3,479,805 | 11/1969 | Soteropulos | 56/192 |
| 3,599,402 | 8/1971 | Heising et al. | 56/2 |
| 3,675,404 | 7/1972 | Izakson | 56/209 |
| 4,003,191 | 1/1977 | Todd et al. | 56/209 |

*Primary Examiner*—Louis G. Mancene
*Assistant Examiner*—Paul J. Hirsch
*Attorney, Agent, or Firm*—James C. Nemmers; Haven E. Simmons

[57] ABSTRACT

An attachment for a conventional level-land grain combine which allows the combine to be operated and the grain to be harvested on the slopes of hillsides without excessive buildup of the grain on the low side of the machine. The attachment includes movable doors which vary the size of the opening between the gathering and cutting unit and the feeding and separating unit. By partially closing off the opening on the low side of the machine, more of the grain is fed to the high side thus providing for more even distribution of the grain into the threshing and separating units. Movement of the doors is remotely controlled by the operator according to the slope of the hillside on which the machine is operating.

10 Claims, 3 Drawing Figures

HILLSIDE ATTACHMENT FOR COMBINES

BACKGROUND OF THE INVENTION

This invention relates generally to harvesting machines of the self-propelled combine type. As is well known to those skilled in the art, the self-propelled combine is commercially available in either a level-land combine or a hillside combine. The level-land combine is supported on a fixed drive axle, and thus when the combine operates over rolling ground, the operative portions of the combine tilt with the contour of the ground. Although the separating and cleaning units of the combine can handle some degree of tilt without a loss in efficiency, if the combine becomes tilted too much, the crop being harvested builds up on the low side of the machine, resulting in poor separating and cleaning action. When this occurs, the material being harvested overloads the sieve and cleaning shoe on the low side of the machine and the efficiency of the separating action is lessened, resulting in excessive crop losses.

There are commercially available attachments for level-land combines that are to be frequently operated on hilly terrain. These side hill attachments are usually shields or deflectors added to the separator unit to prevent the material being harvested from falling to one side of the separator. These devices, however, do not effectively reduce the material buildup on the low side of the machine since the material has already accumulated on the low side by the time it moves to the separator unit. As a result, separating and cleaning action may still be adversely affected when the combine operates on steep side hills. To some degree, the efficiency of the level-land combine can be maintained when it is operated on side hills by reducing the speed of the combine in order to give the material on the low side time to be processed. This has the obvious disadvantage of substantially increasing the operators harvesting time when very often time is critical.

In addition to the level-land combines, there are combines designed to operate on rolling terrain. These hillside combines generally are supported on pivoting axles which adjust to the changing slopes of the ground and thereby automatically maintain the separator and cleaning units level. In these hillside combines, the header assembly automatically conforms to the slope. An example of this type of hillside combine is disclosed in Clifford et al U.S. Pat. No. 2,947,134, dated Aug. 2, 1960 and entitled "Adjustable Header Device for Hillside Combine." The hillside combine operates very efficiently on either level ground or side hills, but because of the necessary mechanism to compensate for hillside operation, these combines are considerably more expensive then the level-land combines. For a farmer who has primarily level ground but who must harvest some of his crop on side hills, the cost of the hillside combine is prohibitive.

There is, therefore, a need for a combine or an attachment for a combine which will allow the combine to be operated on hillsides without materially affecting the efficiency or the speed of the harvesting operation. Such a combine or attachment must also be relatively low in cost and easy to operate and maintain.

SUMMARY OF THE INVENTION

The invention provides an attachment for level-land combines that will allow these combines to operate efficiently on slopes. This is accomplished by controlling the flow of material being harvested at the earliest possible time in the harvesting operation. According to the principles of the invention, means is provided to regulate the flow of grain after it has been cut but before it moves into the feeder-conveyor unit for delivery to the threshing unit. In the preferred embodiment of the invention, regulation of the flow of grain is accomplished by varying the size and relative position of the opening leading to the thresher's feeder-conveyor unit. This forces more of the incoming grain to the high side of the unit so that it will be substantially uniformly distributed by the time it reaches the separating and cleaning units. Regulation of the size and relative position of the opening into the feed conveyor can be controlled remotely by the operator or suitable means can be devised to automatically regulate the opening, depending upon the degree of slope upon which the combine is operating.

DESCRIPTION OF THE PREFERRED EMBODIMENT OF THE INVENTION

Figure 1:
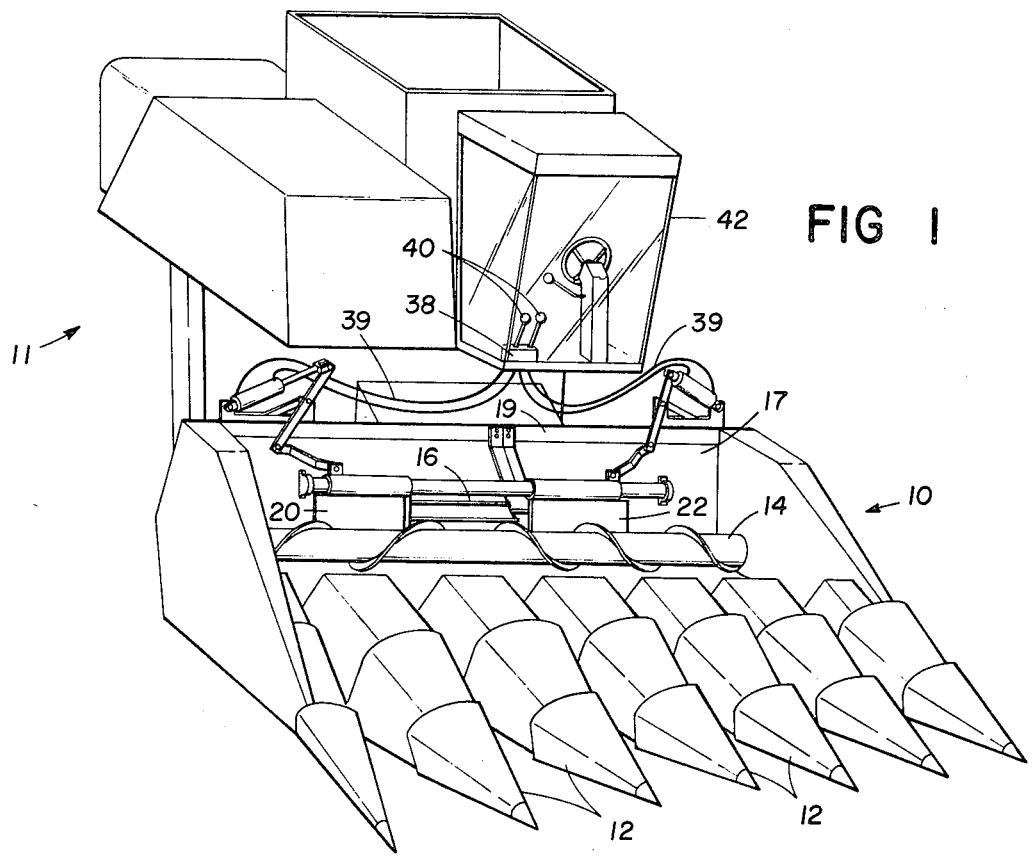
FIG. 1 is a perspective view of the front portion of a standard combine or threshing unit (with the wheels removed) but showing the attachment of the invention installed thereon.

The combine II shown in the drawings is of a standard well-known design which is capable of having attached thereto a gathering and harvesting unit, such as a corn head, indicated generally by the reference numeral 10, or a reel type unit (not shown) for harvesting wheat and other crops. The principles of the invention are applicable to both types of head attachments.

The corn head attachment 10 shown in FIG. 1 includes a plurality of gathering snouts 12 inside of which are a plurality of strippers (not shown) which strip the ears of corn from the stalks. Movement of the combine forward through the rows of corn strips the ears of corn from the stalks and feeds them into an auger 14 that extends transversely to the direction of movement of the combine. Note that the auger 14 is of the dual pitch type which feeds the ears of corn from both sides of the combine unit toward the center.

A front housing 17 is affixed to the frame 19 of the combine behind the auger 14. An opening 16 in housing 17 leads to a slat type feeder-conveyor 18 that feeds the corn into the threshing unit itself. The details of the remainder of the basic combine are not shown in the drawing since the construction and operation thereof is well known to those skilled in the art. Briefly, however, the feeder-conveyor 18 carries the ears of the corn to the rear of the combine to a threshing cylinder that shells the kernels of corn from the cob and passes the kernels back to sieves. The kernels of corn fall through the sieves onto a cleaning shoe that, with the help of an air blast from a cleaning fan, separates the dirt, debris and other foreign material from the kernels of corn. The debris is passed out the back of the machine onto the ground or into a tailings elevator for rethreshing. At the same time, the individual kernels of corn pass through the cleaning shoe into a loading auger and clean grain elevator for distribution into a holding tank.

As previously indicated, the prior art level-land combine works very well on terrain that is substantially level. However, when operated on a hillside, gravity tends to move the shelled corn to one side of the sieve where it accumulates. Because of the uneven distribution of the corn over the sieves, the sieves become overloaded and some of the corn is passed with the debris rather than with the clean grain and is either lost or rethreshed. In either event, the efficiency of the combine is greatly reduced. This overloading on one side of the sieves when the combine is operated on a hillside can sometimes be minimized if the operator will slow down the machine. However, this also greatly reduces the farmer's productivity. The attachment of the invention allows the machine to be operated at a normal speed while very simply providing for more even distribution of the corn over the sieves.

Figure 2:
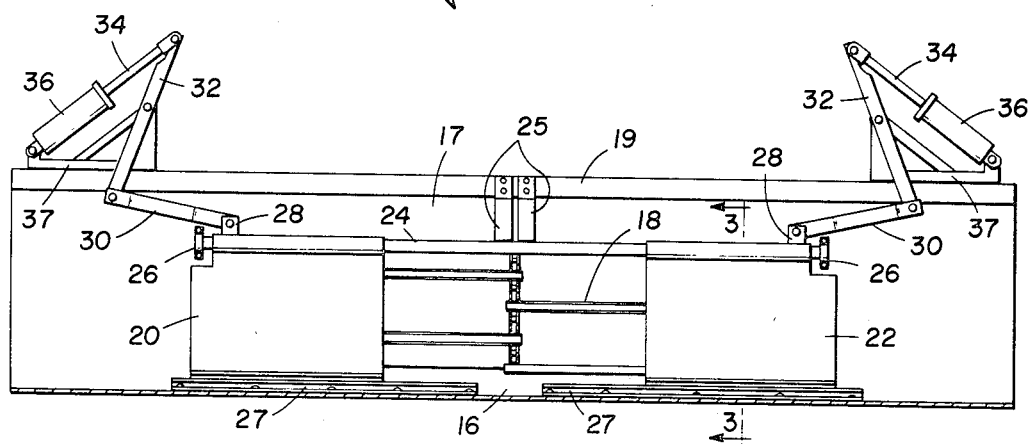
FIG. 2 is an enlarged front view of the attachment shown in FIG. 1 with the auger and corn head removed.
Figure 3:
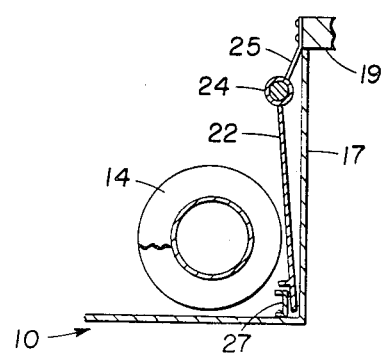
FIG. 3 is a sectional view taken on the line 3—3 of FIG. 2 and showing further details of the regulating attachment.

The attachment of the invention is shown in FIG. 1 and in more detail in FIG. 2 and consists generally of a pair of laterally movable doors 20 and 22, the upper ends of which are slidably mounted on the transverse supporting bar 24 that is affixed by supports 25 in any suitable manner to the housing 17 of the combine behind the auger 14 and ahead of the opening 16 leading to the feeder-conveyor 18. At the outer ends of the supporting bar 24 are suitable end members or stops 26 which prevent the doors 20 and 22 from sliding off the support bar 24. Also, guides 27 are provided along the lower edges of doors 20 and 22 to assure free and property lateral movement.

Each of the doors 20 and 22 is independently movable and power operated, preferably hydraulically. An attaching bracket 28 is affixed to the upper portion of each of the doors 20 and 22, and one end of an arm 30 is pivotally attached to the attaching bracket 28 with the other end of arm 30 being attached to a lever 32. The other end of lever 32 is attached to the operating rod 34 of a hydraulic cylinder 36. The hydraulic cylinders 36 (one for each of the doors 20 and 22) are mounted on supports 37 affixed in any suitable manner to the frame 19 of the combine as shown in FIG. 2. Hydraulic lines 39 lead from the hydraulic cylinders 36 to the hydraulic system (not shown) of the combine and are controlled through a control unit 38 located in the operator's cab 42. The control unit 38 includes levers 40, one of which operates each of the hydraulic cylinders 36.

The hydraulic cylinders 36 and the foregoing described linkage connected them to the doors 20 and 22 have a fixed stroke so that when operating rods 34 are fully contracted, the doors fully close the opening 16 and when fully extended the opening 16 is not blocked off at all. FIG. 1 shows the left hand door 22 fully closed and the right hand door 20 fully open. In this position, opening 16 has its left half completely blocked off.

Thus, the combine operator from his position in the cab 42 can independently move each of the doors 20 and 22 to an infinite number of positions along the supporting bar 24. When each of the doors 20 and 22 is moved to its outward-most position, the opening 16 is fully open. This is the position that would be normal when the combine is operating over level ground. However, when the combine is operating on the hillside, the one of doors 20 and 22 that is on the downhill side of the combine is moved toward the center of the opening 16. The greater the slope of the hillside, the more the door on the downhill side is moved toward the center of the opening 16. This forces more of the material from the gathering and harvesting unit (corn head 10) to be fed by the auger 14 to the uphill side of the combine, thus temporarily overloading the uphill side. By the time this excess amount of grain is fed by conveyor 18 onto the sieves of the separating unit, it will be substantially uniformly fed by gravity over the sieves, thus minimizing overloading of the separating unit on the downhill side.

Because each of the doors 20 and 22 is operated independently of the other, it is obvious that either side of the opening 16 can be closed off to almost any degree. The operator of the combine, being able to view the amount of corn being fed into the separating unit, can by manually operating levers 40 regulate the corn fed to one side or the other of the separating unit by conveyor 18. Thus, the operator has great flexibility to vary the feeding of the grain into the separating unit depending upon the particular terrain conditions encountered.

As an alternative to the preferred embodiment which shows two independently operated doors, the two doors 20 and 22 can be connected together so as to move as a unit by operation of a single hydraulic cylinder with a larger stroke. With such an arrangement, it is obvious that by moving the two doors 20 and 22 simultaneously to the right or left, the opening 16 can be blocked off on one side or the other in a manner very similar to the independently operable doors 20 and 22 as described above. In some instances, it may be more desirable to have two doors connected together and movable from right to left by a single cylinder.

Those skilled in the art will appreciate not only the simplicity but the efficiency of the attachment of the invention. Not only is the attachment simple and relatively inexpensive, but it can be installed as original equipment or added on to units in the field. Because the attachment minimizes the loss of corn or other grain being harvested due to overloading on side hills, the farmer's yield will increase. Moreover, the attachment does not slow down his rate of production since the combine can be operated at normal speeds regardless of the terrain.

Having thus described a preferred embodiment of my invention, it will be obvious to those skilled in the art that various revisions and modifications can be made to the preferred embodiment described herein without departing from the spirit and scope of the invention. It is my intention, however, that all such revisions and modifications as are obvious to those skilled in the art will be included within the scope of the following claims.

I claim:

1. For use in a harvesting machine or combine having a grain gathering and harvesting unit, a threshing unit rearwardly of said harvesting unit, and feeding means for transporting the grain collected by the harvesting unit to the threshing unit through a grain intake opening, control means for more evenly distributing the grain collected by the harvesting unit when said combine operates on a side hill, said control means comprising regulating means located between said harvesting unit and said threshing unit to selectively direct a greater amount of grain discharged from the harvesting unit through said intake opening to a selected side of said threshing unit.

2. The control means of the combine of claim 1 in which said control means includes movable means to vary said grain intake opening so as to direct a greater amount of grain discharged from the harvesting unit through said intake opening to a selected side of said threshing unit.

3. The control means of the combine of claim 2 in which said movable means varies said grain intake opening by moving the vertical center line of said opening from its normal position substantially in the center of said feeding means toward a selected side of said threshing unit.

4. The control means of the combine of claim 3 in which the width of said grain intake opening is varied by moving a selected side margin of said opening toward the normal center line of said opening.

5. The control means of the combine of claim 1 in which said regulating means comprises a grain blocking member on each side of said grain intake opening, said members being movable transversely across said opening to block a portion a said opening on a selected side thereof.

6. The control means of the combine of claim 5 in which said blocking members are movable independently of each other.

7. The control means of the combine of claim 5 in which said blocking members are mounted for slidable movement transversely across said grain intake opening.

8. The control means of the combine of claim 6 in which each of said blocking members is mounted for independent slidable movement transversely across said grain intake opening, and power means controlled by the combine operator is operatively connected to each of said blocking members.

9. The control means of the combine of claim 8 in which said power means includes a hydraulic cylinder operatively connected to each of said blocking members to produce slidable movement thereof.

10. The control means of the combine of claim 7 in which hydraulically-operated power means controlled by the combine operator is operatively connected to said blocking members to produce slidable movement thereof across said grain intake opening.

* * * * *